United States Patent
Faber et al.

(10) Patent No.: US 9,376,052 B2
(45) Date of Patent: Jun. 28, 2016

(54) METHOD FOR ESTIMATING A ROADWAY COURSE AND METHOD FOR CONTROLLING A LIGHT EMISSION OF AT LEAST ONE HEADLIGHT OF A VEHICLE

(75) Inventors: Petko Faber, Renningen (DE); Johannes Foltin, Ditzingen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 87 days.

(21) Appl. No.: 14/240,472

(22) PCT Filed: Jul. 3, 2012

(86) PCT No.: PCT/EP2012/062923
§ 371 (c)(1),
(2), (4) Date: May 16, 2014

(87) PCT Pub. No.: WO2103/026609
PCT Pub. Date: Feb. 28, 2013

(65) Prior Publication Data
US 2014/0249715 A1     Sep. 4, 2014

(30) Foreign Application Priority Data

Aug. 23, 2011 (DE) .......................... 10 2011 081 397

(51) Int. Cl.
*G06K 9/00* (2006.01)
*B60Q 1/08* (2006.01)

(52) U.S. Cl.
CPC ............ *B60Q 1/085* (2013.01); *G06K 9/00536* (2013.01); *G06K 9/00798* (2013.01); *G06K 9/00825* (2013.01)

(58) Field of Classification Search
USPC .......... 382/104, 103, 190, 195, 199; 701/301, 701/1, 23, 28, 27, 300, 523
See application file for complete search history.

(56) References Cited

U.S. PATENT DOCUMENTS 6,215,392 B1 * 4/2001 Okada ........................... 340/436
6,282,483 B1 * 8/2001 Yano et al. ...................... 701/96

(Continued)

FOREIGN PATENT DOCUMENTS

DE     10 2007 012834     9/2008
EP     1 400 916          3/2004

(Continued)

OTHER PUBLICATIONS

Shoichi Shimizu et al: "Recognition of Road Contours Based on Extraction of 3D Positions of Delineators", Intelligent Transportation Systems Conference, 2007. ITSC 2007. IEEE, IEEE, PI, Sep. 1, 2007, pp. 672-677, XP031151496, ISBN : 978-1-4244-1395-9.

(Continued)

*Primary Examiner* — Thomas Tarcza
*Assistant Examiner* — Richard Goldman
(74) *Attorney, Agent, or Firm* — Norton Rose Fulbright US LLP

(57) ABSTRACT

A method for estimating a roadway course in a roadway section ahead of a vehicle in the direction of travel is provided. The method includes recognizing at least one reflective or self-luminous object in an image of the roadway section. The method also includes ascertaining a position of the at least one object based on the image of the roadway section. The method also includes estimating the roadway course using the ascertained position of the at least one object.

9 Claims, 2 Drawing Sheets

(56) References Cited

U.S. PATENT DOCUMENTS

| | | | |
|---|---|---|---|
| 7,459,664 B2* | 12/2008 | Schofield et al. | 250/208.1 |
| 8,543,254 B1* | 9/2013 | Schut et al. | 701/1 |
| 8,699,754 B2* | 4/2014 | Zhang et al. | 382/104 |
| 8,948,954 B1* | 2/2015 | Ferguson et al. | 701/23 |
| 8,949,016 B1* | 2/2015 | Ferguson et al. | 701/301 |
| 2004/0167702 A1* | 8/2004 | Isogai et al. | 701/96 |
| 2005/0036660 A1* | 2/2005 | Otsuka et al. | 382/104 |
| 2006/0155427 A1* | 7/2006 | Yang | 701/1 |
| 2008/0040039 A1* | 2/2008 | Takagi | 701/300 |
| 2008/0043099 A1* | 2/2008 | Stein et al. | 348/118 |
| 2008/0133136 A1* | 6/2008 | Breed et al. | 701/301 |
| 2010/0104199 A1* | 4/2010 | Zhang et al. | 382/199 |
| 2010/0289632 A1* | 11/2010 | Seder et al. | 340/436 |
| 2012/0050074 A1* | 3/2012 | Bechtel et al. | 340/988 |
| 2012/0053755 A1* | 3/2012 | Takagi | 701/1 |
| 2012/0069181 A1* | 3/2012 | Xue et al. | 348/148 |
| 2012/0083959 A1* | 4/2012 | Dolgov et al. | 701/23 |
| 2012/0253596 A1* | 10/2012 | Ibrahim et al. | 701/36 |
| 2012/0323474 A1* | 12/2012 | Breed et al. | 701/117 |
| 2013/0253753 A1* | 9/2013 | Burnette et al. | 701/26 |
| 2014/0036080 A1* | 2/2014 | Schut et al. | 348/148 |
| 2014/0247351 A1* | 9/2014 | Murillo Amaya et al. | 348/148 |
| 2014/0249715 A1* | 9/2014 | Faber et al. | 701/36 |
| 2014/0379218 A1* | 12/2014 | Foltin | 701/41 |

FOREIGN PATENT DOCUMENTS

| | | |
|---|---|---|
| EP | 2 040 196 | 3/2009 |
| EP | 2 116 958 | 11/2009 |
| JP | 11 203458 | 7/1999 |

OTHER PUBLICATIONS

Smuda Vonz Trzebiatowski M et al : "Detecting reflection posts—lane recognition on country roads", Intelligent Vehicles Symposium, 2004 IEEE Parma, Italy, Jun. 14-17, 2004, Piscataway, NJ, USA, IEEE, Jun. 14, 2004, pp. 304-309, XP010727486, DOI: 10.1109/IVS.2004.1336399, ISBN: 978-0/7803-83104.

Uwe-Philipp Kaeppeler : "Erkennung und Verfolgung von Leitpfosten zur Spurpraediktion" Diplomarbeit Ltniversitaet Stuttgart, XX, XX, Sep. 30, 2003, page complete, XP002461061.

* cited by examiner

METHOD FOR ESTIMATING A ROADWAY COURSE AND METHOD FOR CONTROLLING A LIGHT EMISSION OF AT LEAST ONE HEADLIGHT OF A VEHICLE

FIELD OF THE INVENTION

The present invention relates to a method for estimating a roadway course in a roadway section ahead of a vehicle in the direction of travel, a method for controlling a light emission of at least one headlight of a vehicle, and devices which are configured to carry out the steps of such a method.

BACKGROUND INFORMATION

The visual range in traffic is usually greatly limited at night. Headlights normally illuminate straight ahead. Adaptive headlights have been introduced to increase the visual range in curves. In classical adaptive headlights, data of the inertial sensor system such as steering angle, yaw rate, and speed are evaluated to estimate the curve radius traveled and accordingly direct the adaptive headlights into the traveled curve. Thus, classical adaptive headlights evaluate the instantaneous trajectory of the vehicle, and therefore the adaptive headlights control based on data from the past. This may cause problems when entering and exiting curves, as well as in alternating curves or S curves, since the future roadway course cannot be deduced from the past or present roadway course. As a result, the adaptive headlights sometimes illuminate in the wrong direction.

German patent document DE 10 2007 012 834 A1 relates to a method for implementing an adaptive headlight function of a vehicle headlight.

SUMMARY OF THE INVENTION

Against this background, the present invention presents an improved method for estimating a roadway course in a roadway section ahead of a vehicle in the direction of travel, an improved method for controlling a light emission of at least one headlight of a vehicle, an improved device, and an improved computer program product according to the main claims. Advantageous embodiments result from the respective subclaims and the following description.

The present invention is based on the finding that a roadway course may be estimated via points of light, generated by at least one reflective or self-luminous object, in an image of the roadway in darkness. The estimated roadway course may then be used, for example, for controlling driver assistance systems and the like, for example adaptive headlights. The estimation may be carried out with the aid of a suitable detection algorithm, for example vehicle detection in darkness (VDD). VDD is configured, for example, to recognize and classify other road users, streetlights, and reflectors as objects. The roadway course is estimated, for example, based on object positions and measuring results of a detection algorithm. Driver assistance systems such as adaptive headlights may be controlled on this basis. The estimated roadway course is thus utilized, for example, to control the adaptive headlights.

One advantage of the present invention is that an image-based or video-based option is provided for recognizing the roadway course or curve shape in an anticipatory manner, and to appropriately orient the adaptive headlights, for example. It is possible to enlarge a range during an anticipatory estimation of the roadway course or lane course. Traffic safety as well as driving comfort are thus increased, since adaptive headlights, for example, may be adapted in a highly anticipatory manner to the most correct estimated roadway course possible. Moreover, this is possible using only one vehicle camera or the like without the need for a navigation device or the like, so that the roadway course may be estimated in a cost-effective and space-saving manner.

The present invention provides a method for estimating a roadway course in a roadway section ahead of a vehicle in the direction of travel, the method having the following steps:

recognizing at least one reflective or self-luminous object in an image of the roadway section;

ascertaining a position of the at least one object based on the image of the roadway section; and estimating the roadway course using the ascertained position of the at least one object.

The vehicle may be a motor vehicle, for example a passenger vehicle, a truck, or a utility vehicle. The at least one headlight may be, for example, a headlight for illuminating the roadway. The at least one headlight may have a headlight unit which includes multiple headlight modules or the like. The image of the roadway section may have been detected by an image detection device of the vehicle. The image may have been recorded by a vehicle camera. A viewing direction of the vehicle camera may correspond to an instantaneous direction of travel of the vehicle. The at least one reflective or self-luminous object may be, for example, a reflector of a guide post, a traffic sign, a lane marking, a lamp of a switched-on streetlight, a warning light or other roadway illumination, a headlight of another vehicle, or the like. The object may be illuminated by a headlight of the vehicle or of another vehicle or another light source, and may thus be reflective, such as a guide post and its reflector, for example. A reflective object may represent a reflector which is configured for reflecting light, or a surface that is different in terms of color or different from the surroundings in some other way with regard to reflectivity. The at least one reflective or self-luminous object may be situated along the roadway course on, next to, or above the roadway. Thus, after the position of the at least one object is ascertained, the roadway course may be estimated or determined in some other suitable way.

A plurality of reflective or self-luminous objects in the image of the roadway section may be recognized in the step of recognizing. Positions of the plurality of objects may be ascertained, based on the image of the roadway section, in the step of ascertaining. In addition, the roadway course may be estimated, using the ascertained positions of the plurality of objects, in the step of estimating. The plurality of reflective or self-luminous objects may be situated along the roadway course, in particular on, next to, or above the roadway. For example, the plurality of objects may be headlights of a vehicle convoy, guide posts and their reflectors, or the like. Such a specific embodiment offers the advantage that the roadway course may be estimated more reliably and accurately based on the plurality of objects.

According to one specific embodiment, the at least one object in a plurality of images of the roadway section may be recognized in the step of recognizing. A change over time of a position of the at least one object may be ascertained, based on the plurality of images of the roadway section, in the step of ascertaining. In addition, the roadway course may be estimated, using the ascertained change over time of the position of the at least one object, in the step of estimating. A movement and/or a direction of movement of the at least one object may be deduced from the course or a change over time in the position of the at least one object from image to image. The vehicle's own motion may also be taken into account. The plurality of images of the roadway section may be successive images of the roadway section or images of the roadway section that are recorded in a definable time interval. Such a specific embodiment offers the advantage that the roadway course may be estimated more reliably and accurately based on the plurality of images.

In addition, a change over time of a position of the at least one object resulting from an exposure time of the image may be ascertained, based on the image of the roadway section, in the step of ascertaining. The roadway course may be estimated, using the ascertained change over time of the position of the at least one object, in the step of estimating. In this regard, the image may be recorded with the aid of long-term exposure. The exposure time of the image may be increased or lengthened relative to a typical exposure time for still cameras. When an object in the image moves during the exposure time, this results in a trace of this movement in the image, this trace corresponding to the change over time of the position. Such a specific embodiment offers the advantage that the roadway course may be estimated more reliably and accurately based on an image using such an exposure time.

The at least one object may be recognized in the image of the roadway section with the aid of image processing in the step of recognizing. In addition, a position of the at least one object in the image of the roadway section may be ascertained in the step of ascertaining. The image may be analyzed with the aid of image processing or image evaluation in order to recognize the at least one reflective or self-luminous object and/or to ascertain the position of the at least one object. Object recognition, model recognition, or the like may also be used. In particular, brightness values in the image may be evaluated. For example, image ranges having brightness values above a definable threshold value may be recognized as objects. An actual position relative to the vehicle may be deduced from the position in the image. Additionally or alternatively, the deduced actual position may be checked with the aid of a suitable sensor system, such as radar. Such a use of the image processing offers the advantage that the roadway course may be estimated in an uncomplicated manner using sensors, and advantageously using hardware and/or software that may already be present. This may save on cost and space.

The method may include a step of combining the estimated roadway course with a detected course of a lane marking of the roadway section in order to generate a plausibility-checked roadway course. A lane marking which indicates a course of a lane, for example, may also advantageously be recognized under bright conditions.

In addition, a step of combining the estimated roadway course with travel data and/or position data of the vehicle may be provided in order to generate a plausibility-checked roadway course. The travel data may include sensor data, for example inertial sensor data, with regard to a steering angle, a yaw rate, a speed, etc., of the vehicle. The travel data for use in the present method may be received by appropriate sensors. The position data may represent a geographical position of the vehicle on a digital map. The position data for use in the present method may be received by a navigation device. Additionally or alternatively, such a digital map may be checked for plausibility based on the estimated roadway course. Such plausibility checking offers the advantage that the estimated roadway course may correspond to an actual roadway course with even higher accuracy.

In addition, a step of determining an object type of the at least one object using the at least one recognized object and/or the ascertained position of the at least one object based on the image of the roadway section may be provided. The roadway course may also be estimated, using the determined object type, in the step of estimating. If the object type of the at least one object is estimated using the at least one recognized object, based on the image of the roadway section, the step of ascertaining and/or the step of estimating may additionally be carried out using the object type. The step of determining the object type may include a classification, object recognition, model recognition, or the like based on the image of the roadway section. The model or type of the at least one object may thus be identified more accurately. Such a classification offers the advantage that the roadway course may be estimated more reliably and accurately.

Moreover, the present invention provides a method for controlling a light emission of at least one headlight of a vehicle, the method having the following steps:
estimating a roadway course in a roadway section ahead of the vehicle in the direction of travel according to the method for estimating a roadway course; and
generating an actuating signal for controlling the light emission of the at least one headlight, using the estimated roadway course.

The light emission of the at least one headlight may be changeable in steps or in a stepless manner. The light emission of the at least one headlight may be characterized by a beam characteristic of the at least one headlight. The beam characteristic may be an illumination range, a light angle, a brightness, and/or the like of the at least one headlight. In particular, a change in the beam characteristic, for example a change in the illumination range or the light angle, of the at least one headlight may take place during the control of the light emission of the at least one headlight. The actuating signal is configured to effect a change in the light emission or beam characteristic of the at least one headlight. The change in the light emission is effected, for example, when the roadway course has a curve. The method may also have a step of combining the estimated roadway course and an instantaneous direction of travel of the vehicle in order to generate a deviation value. For example, a difference between the estimated roadway course and the instantaneous direction of travel may be ascertained in the step of combining. The generated deviation value may, for example, represent this difference.

Thus, the actuating signal may also be generated using the deviation value. The light emission may be changed by the deviation value, for example, in order to be adapted to the estimated roadway course. The deviation value may be taken into account in the actuating signal, and for use in the control of the headlight, is therefore suitable for bringing about the adaptation of the light emission of the at least one headlight to the estimated roadway course. In addition, a first actuating signal and a second actuating signal may be generated in the step of generating. The first actuating signal may correspond to the above-mentioned actuating signal, for example. The second actuating signal may have been determined, for example, based on lane recognition or the like. The first actuating signal may correspond to an estimation of the roadway course in an area remote from the vehicle. The second actuating signal may correspond to an estimation of the roadway course in an area close to the vehicle.

Moreover, the present invention provides a device that is configured to carry out or implement the steps of one of the above-mentioned methods. In particular, the device may have units which are each configured to carry out one step of one of the above-mentioned methods. In addition, as a result of this embodiment variant of the present invention in the form of a device, the underlying object of the present invention may be achieved quickly and efficiently.

In the present context, a device may be understood to mean an electrical device which processes sensor signals and outputs control signals as a function of same. The device may have an interface which may be provided by hardware and/or software. In a hardware configuration, the interfaces may be, for example, part of a so-called system ASIC which contains various functions of the device. However, it is also possible for the interfaces to be dedicated, integrated circuits or to be composed, at least partially, of discrete components. In a software configuration, the interfaces may be software modules which are present in addition to other software modules on a microcontroller, for example.

Also advantageous is a computer program product having program code which is stored on a machine-readable carrier such as a semiconductor memory, a hard drive memory, or an optical memory and used for carrying out one of the above-mentioned methods when the program is executed on a computer or a device.

The present invention is explained in greater detail below with reference to the appended drawings.

DETAILED DESCRIPTION

Figure 1:
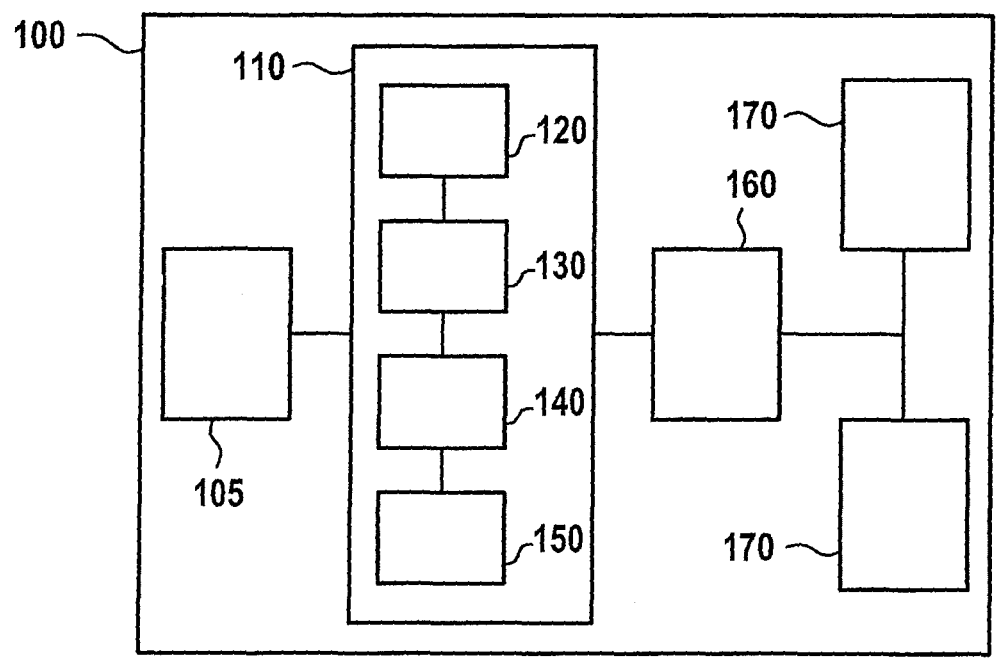
FIG. 1 shows a schematic illustration of a vehicle having a control device according to one exemplary embodiment of the present invention.

In the following description of exemplary embodiments of the present invention, identical or similar reference numerals are used for the elements having a similar action which are illustrated in the various figures, and a repeated description of these elements is dispensed with.

FIG. 1 shows a schematic illustration of a vehicle 100 having a control device according to one exemplary embodiment of the present invention. Vehicle 100 has a vehicle camera 105, a control device 110 including a recognition device 120, an ascertainment device 130, an estimation device 140, and a generation device 150, a control unit 160, and two headlights 170. Vehicle camera 105 is connected to control device 110, and control unit 160 is connected to control device 110, via at least one signal line in each case. Control device 110 is thus connected between vehicle camera 105 and control unit 160. Headlights 170 are connected to control unit 160 via at least one signal line, for example. Thus, control unit 160 is connected between control device 110 and headlights 170. Even though not illustrated in such a way in FIG. 1, control unit 160 may also be part of control device 110, or control device 110 may also be part of control unit 160.

Vehicle camera 105 may have an image processing electronics system. Vehicle camera 105 is configured to record at least one image of a roadway section ahead of the vehicle in the direction of travel, and to output same to control device 110 in the form of image information, image data, or an image signal.

Control device 110 includes recognition device 120, ascertainment device 130, estimation device 140, and generation device 150. Control device 110 is configured to carry out an estimation of a roadway course in a roadway section ahead of vehicle 100 in the direction of travel, and to carry out a control of a light emission of headlight 170 of vehicle 100.

Recognition device 120 is configured to receive the image information, the image data, or the image signal from vehicle camera 105. Recognition device 120 is configured to recognize at least one reflective or self-luminous object in the image of the roadway section based on the data received from vehicle camera 105. In particular, recognition device 120 may recognize the at least one object from the image information, the image data, or the image signal from vehicle camera 105. For this purpose, recognition device 120 may use suitable methods for image processing, image analysis, model recognition, object recognition, and/or the like. Recognition device 120 may output a piece of information concerning the at least one recognized object to ascertainment device 130.

Ascertainment device 130 is configured to receive from recognition device 120 the information concerning the at least one recognized object. Ascertainment device 130 is configured to ascertain a position of the at least one recognized object based on the image of the roadway section or the image information, the image data, or the image signal.

Ascertainment device 130 may be configured to determine the position of the at least one recognized object relative to an instantaneous orientation or direction of travel of the vehicle. If multiple objects are recognized, ascertainment device 130 may additionally or alternatively be configured to determine positions of the objects relative to one another. Ascertainment device 130 is configured to output a piece of information concerning the ascertained position or positions to estimation device 140.

Estimation device 140 is configured to receive from ascertainment device 130 the information concerning the ascertained position or the ascertained positions. Estimation device 140 is also configured to estimate the roadway course, using the ascertained position of the at least one object or the information concerning the ascertained position, or to determine the roadway course in some other suitable manner. If positions of the objects are situated along an instantaneous direction of travel of the vehicle, this indicates a straight roadway course. If at least some of the positions of the objects are offset with respect to an instantaneous direction of travel of the vehicle, this indicates a bend in the roadway course. A magnitude of a lateral offset of the positions with respect to the instantaneous direction of travel may be a measure for the sharpness of the bend in the roadway course.

Estimation device 140 is configured to output a piece of information concerning the estimated roadway course to generation device 150.

Generation device 150 is configured to receive from estimation device 140 the information concerning the estimated roadway course. Generation device 150 is configured to generate an actuating signal for controlling the light emission of the at least one headlight, using the estimated roadway course and the information concerning the estimated roadway course.

Control device 110 is configured to output the actuating signal to control unit 160.

Control unit 160 is configured to receive the actuating signal from control device 110. Control unit 160 is also configured to generate a control signal for controlling headlights 170. Control unit 160 may take into account or use the actuating signal from control device 110 in generating the control signal. The control signal may thus include the actuating signal. Control unit 160 is configured to output the control signal to headlights 170.

Headlights 170 may receive the control signal from control unit 160 via an interface. The actuating signal, which is taken into account in the control signal, may effect adaptation of the light emission to the estimated roadway course. In particular, adaptive headlights may be adapted to a possible curve in the estimated roadway course.

Figure 2A:
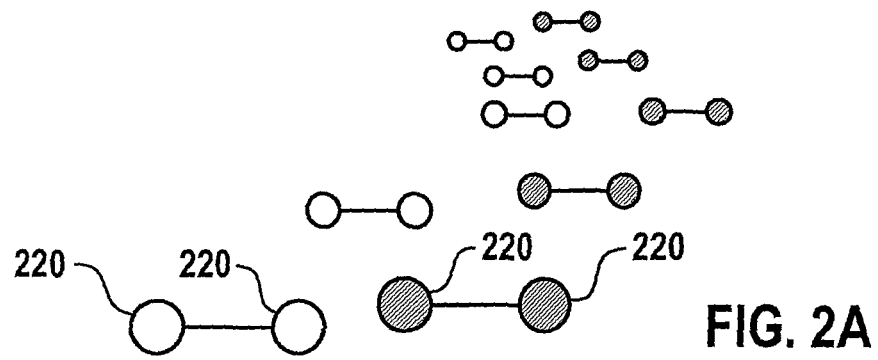
FIGS. 2A and 2B show schematic illustrations of recognized objects and an estimated roadway course.

FIG. 2A shows a schematic illustration of recognized objects 220. Objects 220 may have been recognized with the aid of the control device from FIG. 1, for example, and their positions may have been ascertained. The series of objects 220 illustrated at the left, of which only the front pair is provided with a reference numeral, may be headlights. The series of objects 220 illustrated at the right, of which only the front pair is provided with a reference numeral, may be the headlights or taillights of vehicles. Thus, objects 220 are self-luminous objects. The headlights are illustrated as circular objects 220. In each case, two horizontally adjacent objects 220 in FIG. 2A are connected by a line, and are thus identified as belonging to a single vehicle. Bright circular objects 220 may represent headlights. Dark circular objects 220 may represent taillights. FIG. 2A shows as an example five pairs of dark circular objects 220 in the series on the right which represent the taillights of five preceding vehicles on a roadway, and shows five pairs of bright circular objects 220 in the series on the left which represent the headlights of five oncoming vehicles on a roadway.

The size of objects 220 illustrated in FIG. 2A decreases from bottom to top in the figure. This corresponds to an increasing distance of objects 220 from bottom to top in FIG. 2A. An individual pair of dark circular objects 220 is shown in each case in FIG. 2A as horizontally offset with respect to a vertically adjacent pair of dark circular objects 220. An individual pair of bright circular objects 220 is shown in each case in FIG. 2A as horizontally offset with respect to a vertically adjacent pair of bright circular objects 220. The left and the right series of objects 220 each have a curvature to the left. A bend of the roadway to the left may be deduced therefrom.

Figure 2B:
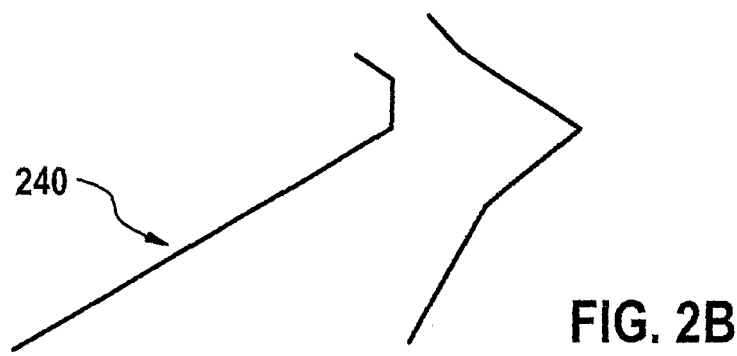

FIG. 2B shows a schematic illustration of an estimated roadway course 240. Roadway course 240 is schematically shown, for example, in the form of two sidelines of a roadway. Roadway course 240 may have been estimated, for example, with the aid of the control device from FIG. 1. Roadway course 240 may in particular have been estimated based on the objects from FIG. 2A. Roadway course 240 results, for example, from connecting pairs of headlights and connecting pairs of taillights from FIG. 2A. To be able to correctly connect objects 220, objects 220 which initially correspond to one another may be associated with one another. Positions of adjacent objects that are associated with one another may subsequently be connected to obtain a position course that depicts the roadway course.

Figure 3A:
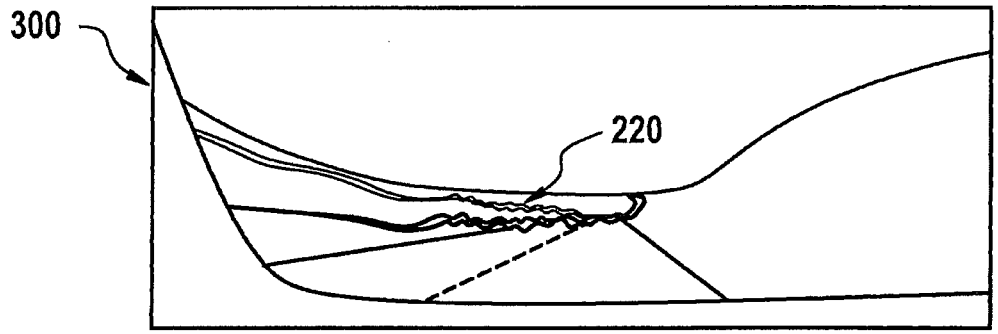
FIGS. 3A and 3B show camera images for use in object recognition.

FIG. 3A shows a camera image 300 for use in object recognition. Camera image 300 may be used by the control device from FIG. 1 in order to recognize objects, estimate a roadway course, and control a light emission of at least one headlight. Camera image 300 is a recording at long-term exposure, self-luminous objects 220 appearing as bright traces in camera image 300.

Figure 3B:
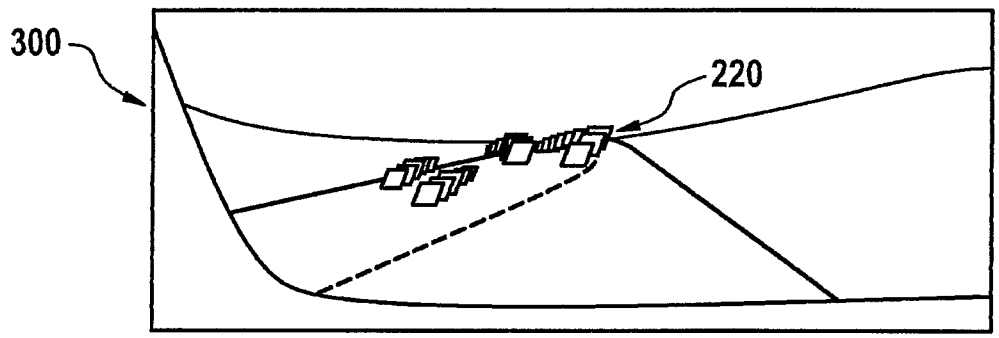

FIG. 3B shows a camera image 300 for use in object recognition. The illustration in FIG. 3B corresponds in principle to the illustration from FIG. 3A, and differs only with regard to the illustrated scene and the recorded traffic situation. Once again a plurality of objects is apparent from which a course of the roadway may be deduced.

Based on camera images 300 from FIGS. 3A and 3B, the roadway course may be estimated by evaluating the history of self-luminous objects. The history in camera image 300 is attained via a long exposure time. It is thus possible to make use of a history and/or movement of self-luminous objects or light objects to reconstruct the roadway course.

In the following discussion, initially the background of the present invention is explained, followed by a summary explanation of various exemplary embodiments of the present invention with reference to FIGS. 1 through 3.

An assistance system for lane recognition provided in a vehicle allows recognition of the lane ahead of the vehicle. A visual range of the lane recognition is sufficient for low beam swiveling having a typical geometric range of approximately 65 m, but is too limited for high beam swiveling. The lane course or the lane recognition is used primarily for lane-keeping assistance systems. Camera systems are becoming increasingly prevalent in the automotive field, also in the lower price segment. The performance of the camera systems is adapted due to the resulting price pressure. If, for example, up to four measuring algorithms are present in the camera, fewer measuring algorithms, for example two, are present in the scaled-down camera systems. If lane-keeping assistance is not present in a camera system, in principle the lane recognition algorithm may be dispensed with, and only high beam assistance and sign recognition, for example, are then installed. In addition, it cannot be assumed that permanently installed navigation systems are present in vehicles in the middle and lower price segments.

According to one exemplary embodiment of the present invention, a roadway course may be estimated as follows. Guide posts equipped with reflectors 220, which are recognized by measuring algorithms such as VDD, are typically situated on the roadside. The guide posts are normally spaced at intervals of 50 m, for example, but in curves and areas of limited visibility they are situated closer to one another. Recognized reflectors 220 may be connected to one another to deduce roadway course 240 ahead of vehicle 100. Reflectors 220 illuminated by the light from headlights are recognized by measuring algorithms such as VDD from a long distance away, so that a higher visual range is possible than with lane recognition. A larger visual range is thus possible, depending on the light distribution. For example, adaptive headlights with the high beam turned on may be implemented in an even more anticipatory manner. On continuously illuminated roadways, such as in the city, streetlights 220 may be used to estimate roadway course 240 and control the adaptive headlights. The presence, position, movement, and direction of travel of other road users may be evaluated, possibly via the color of lights, in order to estimate roadway course 240. If a navigation device is installed in vehicle 100, according to another exemplary embodiment of the present invention a check may be made via recognized light objects 220 as to whether the map information is up-to-date, or vice versa. By detecting signal lights 220 and reflectors 220 on concrete barriers, for example, the adaptive headlights may also be utilized in construction sites and allow, for example, visual guidance of the driver.

A lane-based adaptive headlight system may achieve enhanced anticipation due to the additional use of the method according to exemplary embodiments of the present invention. The lane information may then be used primarily in the close range, and the course in the far range may be determined by the roadway reconstruction or roadway course estimation according to exemplary embodiments of the present invention. A failure rate of the anticipatory adaptive headlights may be reduced by coupling both measuring algorithms. If no lanes are available which have been detected with the aid of lane recognition, roadway course estimation may be used for adaptive headlight control according to exemplary embodiments of the present invention, for example via VDD. If no recognized objects or VDD objects are available according to exemplary embodiments of the present invention, the lane recognition may be used for adaptive headlight control.

The measuring results of VDD include all reflective and self-luminous objects at night, such as other road users, reflectors on guide posts and/or parking vehicles, and streetlights. An advantage in the use of measured data of VDD is the high range, which for self-luminous objects such as oncoming vehicles may be several hundred meters.

Elevated objects, for example, such as guide posts or guard rails in the traffic space, may be detected via other anticipatory sensors such as radar or LIDAR sensors, which are based on transit time measurements of an emitted pulse. The range of advantageous radar or LIDAR systems is below the average detection range of VDD. A high level of anticipation is achieved by utilizing VDD measuring results.

Adaptive headlight systems may likewise be based on lane information obtained from lane markings. In contrast to the VDD measuring results, the lanes may also be recognized during the day and utilized, for example, for a lane departure warning. A disadvantage of lane recognition is the limited anticipation, which frequently may be less than a hundred meters.

If the evaluation of further measured data such as lane markings may be dispensed with due to the advantageous use of VDD measuring results for estimating the lane course, it is possible to configure the sensor to be less powerful for the subsequent evaluation, and thus save on system costs. As the result of lower system costs, assistance systems may also become established in the lower vehicle price segment, so that the overall safety in traffic may be increased.

Figure 4:
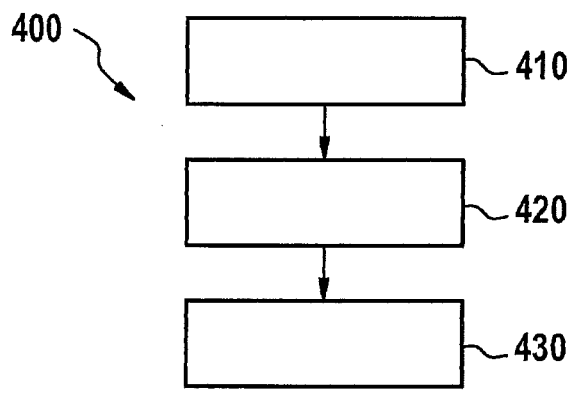
FIG. 4 shows a flow chart of a method according to one exemplary embodiment of the present invention.

FIG. 4 shows a flow chart of a method 400 for estimating a roadway course in a roadway section ahead of a vehicle in the direction of travel according to one exemplary embodiment of the present invention. Method 400 has a step of recognizing 410 at least one reflective or self-luminous object in an image of the roadway section. Method 400 also has a step of ascertaining 420 a position of the at least one object based on the image of the roadway section. Method 400 also has a step of estimating 430 the roadway course using the ascertained position of the at least one object. Method 400 may be carried out or implemented in conjunction with the control device of the vehicle from FIG. 1.

Figure 5:
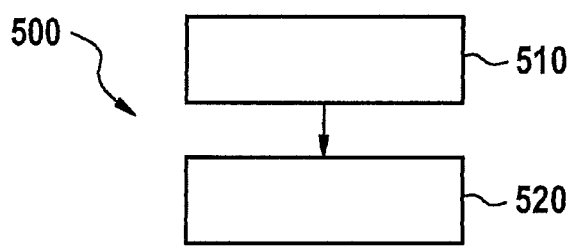
FIG. 5 shows a flow chart of a method according to another exemplary embodiment of the present invention.

FIG. 5 shows a flow chart of a method 500 for controlling a light emission of at least one headlight of a vehicle according to one exemplary embodiment of the present invention. Method 500 has a step of estimating 510 a roadway course in a roadway section ahead of the vehicle in the direction of travel. Step of estimating 510 may include substeps which correspond to the steps of the method from FIG. 4 for estimating a roadway course in a roadway section ahead of a vehicle in the direction of travel. Method 500 also has a step of generating 520 an actuating signal for controlling the light emission of the at least one headlight, using the estimated roadway course. Method 500 may be carried out or implemented in conjunction with the control device of the vehicle from FIG. 1.

The exemplary embodiments which are described and shown in the figures are selected only as examples. Different exemplary embodiments may be combined with one another in their entirety, or with respect to individual features. In addition, one exemplary embodiment may be supplemented with features of another exemplary embodiment. Furthermore, method steps according to the present invention may be repeated and carried out in a sequence other than that described.

An exemplary embodiment which includes an "and/or" linkage between a first feature and a second feature may be construed in such a way that according to one specific embodiment, the exemplary embodiment includes the first feature as well as the second feature, and according to another specific embodiment includes only the first feature or only the second feature.

What is claimed is:

1. A method for estimating a roadway course in a roadway section ahead of a vehicle as the vehicle is moving in the direction of travel, the method comprising:
    recognizing, by a computer processor, at least one reflective or self-luminous object in an image of the roadway section;
    ascertaining, by a computer processor, a change over time of a position of the at least one object based on the image of the roadway section, the ascertaining including evaluating a trace of a movement of the at least one object in the image taken by a camera according to a long-term exposure; and
    estimating, by a computer processor, the roadway course using the ascertained position of the at least one object.

2. The method of claim 1, wherein a plurality of reflective or self-luminous objects in the image of the roadway section is recognized in the recognizing operation, positions of the plurality of objects are ascertained, based on the image of the roadway section, in the ascertaining, and the roadway course is estimated, using the ascertained positions of the plurality of objects.

3. The method of claim 1, wherein the at least one object in a plurality of images of the roadway section is recognized in the recognizing operation, a change over time of a position of the at least one object is ascertained, based on the plurality of images of the roadway section, in the ascertaining, and the roadway course is estimated, using the ascertained change over time of the position of the at least one object, in the estimating.

4. The method of claim 1, further comprising:
    combining the estimated roadway course with at least one of travel data and position data of the vehicle to generate a plausibility-checked roadway course.

5. The method of claim 1, further comprising:
    combining the estimated roadway course with a detected course of a lane marking of the roadway section to generate a plausibility-checked roadway course.

6. The method of claim 1, further comprising:
    determining an object type of the at least one object using at least one of the at least one recognized object and the ascertained position of the at least one object based on the image of the roadway section, the roadway course being additionally estimated using the determined object type in the estimating.

7. A method for controlling a light emission of at least one headlight of a vehicle as the vehicle moves along the direction of travel, the method comprising:
    estimating, by a computer processor, a roadway course in a roadway section ahead of the vehicle in the direction of travel by performing the following:
        recognizing, by a computer processor, at least one reflective or self-luminous object in an image of the roadway section;
        ascertaining, by a computer processor, a change over time of a position of the at least one object based on the image of the roadway section, the ascertaining including evaluating a trace of a movement of the at least one object in the image taken by a camera according to a long-term exposure; and estimating, by a computer processor, the roadway course using the ascertained position of the at least one object; and generating, by a computer processor, an actuating signal for controlling the light emission of the at least one headlight, using the estimated roadway course.

8. A device for estimating a roadway course in a roadway section ahead of a vehicle in the direction of travel, comprising:

a recognizing arrangement to recognize at least one reflective or self-luminous object in an image of the roadway section;

an ascertaining arrangement to ascertain a change over time of a position of the at least one object based on the image of the roadway section, the ascertaining including evaluating a trace of a movement of the at least one object in the image taken by a camera according to a long-term exposure; and an estimating arrangement to estimate the roadway course using the ascertained position of the at least one object.

9. A non-transitory computer readable medium having a computer program, which is executable by a processor, comprising:

a program code arrangement having program code for estimating a roadway course in a roadway section ahead of a vehicle as the vehicle is moving in the direction of travel, by performing the following:

recognizing at least one reflective or self-luminous object in an image of the roadway section;

ascertaining a change over time of a position of the at least one object based on the image of the roadway section, the ascertaining including evaluating a trace of a movement of the at least one object in the image taken by a camera according to a long-term exposure; and estimating the roadway course using the ascertained position of the at least one object.

* * * * *